US012609394B2

(12) United States Patent　　　　(10) Patent No.:　US 12,609,394 B2
Okamoto et al.　　　　　　　　　　(45) Date of Patent:　　Apr. 21, 2026

(54) BATTERY FRAME FOR VEHICLE

(71) Applicant: Nissan Motor Co., Ltd., Yokohama (JP)

(72) Inventors: Yuuji Okamoto, Kanagawa (JP); Shinya Akizuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 303 days.

(21) Appl. No.: 18/562,808

(22) PCT Filed: May 25, 2021

(86) PCT No.: PCT/JP2021/019706
§ 371 (c)(1),
(2) Date: Nov. 20, 2023

(87) PCT Pub. No.: WO2022/249261
PCT Pub. Date: Dec. 1, 2022

(65) Prior Publication Data
US 2024/0274955 A1　　Aug. 15, 2024

(51) Int. Cl.
*B60R 16/04*　　　(2006.01)
*H01M 50/249*　　(2021.01)
(Continued)

(52) U.S. Cl.
CPC ........... *H01M 50/249* (2021.01); *B60R 16/04* (2013.01); *H01M 50/317* (2021.01); *H01M 50/358* (2021.01); *H01M 2220/20* (2013.01)

(58) Field of Classification Search
CPC .... B60K 1/04; B60K 11/06; B60K 2001/005; B60K 2001/0422; B60K 2001/0433; B60K 2001/0438; B60L 50/66; B60L 58/26; H01M 10/613; H01M 10/625; H01M 50/249; H01M 50/278; H01M 50/317;
(Continued)

(56) References Cited

U.S. PATENT DOCUMENTS 5,643,691 A　*　7/1997　Iwatsuki ............. H01M 50/383
429/61
10,141,554 B2 *　11/2018　Khandelwal ........ H01M 50/204
(Continued)

FOREIGN PATENT DOCUMENTS

CN　　110190212 A　*　8/2019　.......... H01M 50/289
CN　　111384328 A　*　7/2020　............ H01M 10/48
(Continued)

OTHER PUBLICATIONS

English Translation of CN 111384328 A. Accessed on Nov. 15, 2025 at www.espacenet.com (Year: 2020).*

*Primary Examiner* — James A Shriver, II
*Assistant Examiner* — Hilary L Johns
(74) *Attorney, Agent, or Firm* — Young Basile Hanlon & MacFarlane, P.C.

(57)　　　　　ABSTRACT

A battery frame comprises: a plate-shaped bottom-surface frame; and side-surface frames including a pair of right and left side frames that are fixed to the outer circumference portion of the bottom-surface frame and extend in the vehicle longitudinal direction. The battery frame is attached to the floor back of the automobile body to support batteries. The side frames are each provided inside with a gas exhaust passage.

4 Claims, 6 Drawing Sheets

(51) Int. Cl.
  *H01M 50/317* (2021.01)
  *H01M 50/358* (2021.01)

(58) Field of Classification Search
  CPC .. H01M 50/358; H01M 2220/20; B60R 16/04
  USPC ....................................................... 180/68.5
  See application file for complete search history.

(56) References Cited

U.S. PATENT DOCUMENTS

| | | | | |
|---|---|---|---|---|
| 2014/0338999 | A1* | 11/2014 | Fujii ....................... | B60L 58/26 |
| | | | | 180/68.5 |
| 2020/0152929 | A1* | 5/2020 | Collins .............. | H01M 50/204 |
| 2021/0066690 | A1* | 3/2021 | Gondoh ............. | H01M 50/367 |
| 2022/0077539 | A1* | 3/2022 | Ren .................... | H01M 50/383 |

FOREIGN PATENT DOCUMENTS

| | | | | |
|---|---|---|---|---|
| CN | 111668408 A | 9/2020 | | |
| JP | H07-245089 A | 9/1995 | | |
| JP | 2003-002249 A | 1/2003 | | |
| WO | 2013/084935 A1 | 6/2013 | | |
| WO | 2019/176415 A1 | 9/2019 | | |
| WO | WO-2020134070 A1 * | 7/2020 | ............ | H01M 10/48 |

* cited by examiner

BATTERY FRAME FOR VEHICLE

TECHNICAL FIELD

The present invention relates to a battery frame for supporting a plurality of battery modules on an automobile body.

BACKGROUND

As a structure for exhausting gas generated by a chemical reaction of a battery electrolyte, there is known a structure in which an exhaust duct is provided in the housing for battery packs (WO2019/176415). This exhaust duct for battery packs includes a hollow guide tube portion, an exhaust inlet for communicating between the inside of the housing and the inside of the guide tube portion, an exhaust outlet for communicating between the inside of the guide tube portion and the outside of the housing, and at least two exhaust guide members provided in the guide pipe portion. This exhaust duct for battery packs has a structure in which the exhaust guide members having a plate-like shape are provided in the guide pipe portion, so it is said that the structure has a high degree of freedom in shape and can adopt a shape, such as a flat rectangular parallelepiped shape, that is suitable for installation in a narrow space inside the housing and this can thereby improve the space utilization ratio of the exhaust duct for battery packs.

SUMMARY

In the above conventional technique, however, even though the space utilization ratio of the exhaust duct for battery packs can be improved, there is a fundamental problem in that the housing for battery packs becomes large enough to accommodate the exhaust duct.

A problem to be solved by the present invention is to increase the space utilization ratio in a battery frame for a vehicle having a gas exhaust function.

The present invention solves the above problem by providing a pair of right and left side frames each inside with a gas exhaust passage, the side frames extending in the vehicle longitudinal direction and being included in a battery frame that supports a battery.

According to the present invention, the gas exhaust passage is provided in each side frame itself that constitutes the battery frame, and the space utilization ratio can therefore be improved.

DETAILED DESCRIPTION

Figure 1:
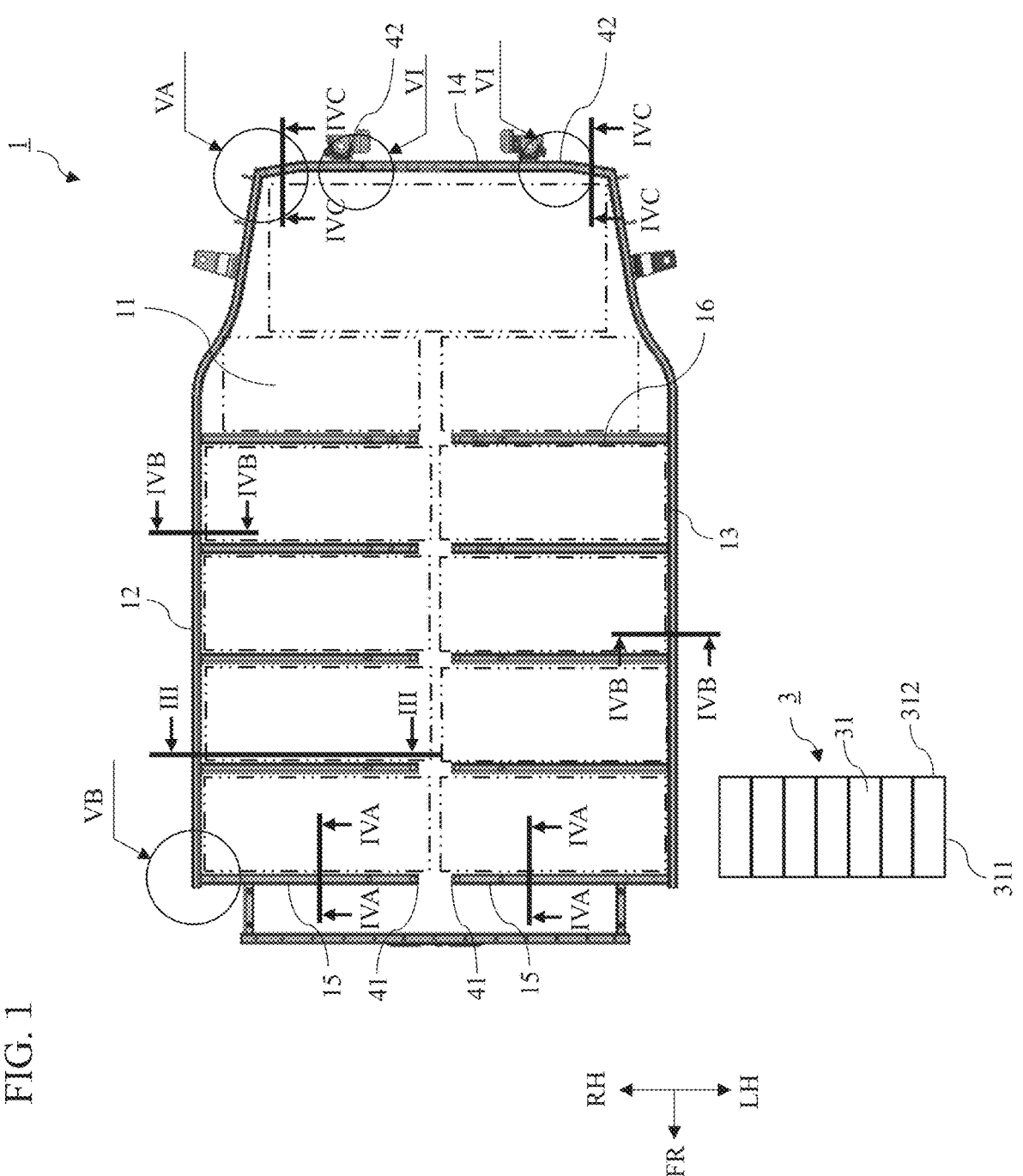
FIG. 1 is a plan view illustrating an embodiment of a battery frame according to the present invention.

Hereinafter, one or more embodiments of the present invention will be described with reference to the drawings. FIG. 1 is a plan view illustrating a battery frame 1 according to the present invention, FIG. 2 is a perspective view illustrating a state in which the battery frame 1 of FIG. 1 is attached to the floor back of an automobile body 2, and FIG. 3 is a cross-sectional view taken along a line III-III of FIG. 1.

The battery frame 1 for a vehicle of the present embodiment is a kind of housing that is attached to the floor back of the automobile body 2 and supports batteries 3. As illustrated in FIG. 1, the battery frame 1 includes a plate-shaped bottom-surface frame 11 and a plurality of plate-shaped side-surface frames 12, 13, 14, and 15 that are fixed to the outer circumferential portion of the bottom-surface frame 11.

The bottom-surface frame 11 of the present embodiment may be configured as an integrated component as a whole by extrusion molding of an aluminum material, but alternatively may be assembled as a single flat plate by welding several sub-frames of bottom-surface frame which are divided along dividing lines extending in the longitudinal direction of the automobile body 2.

Figure 2:
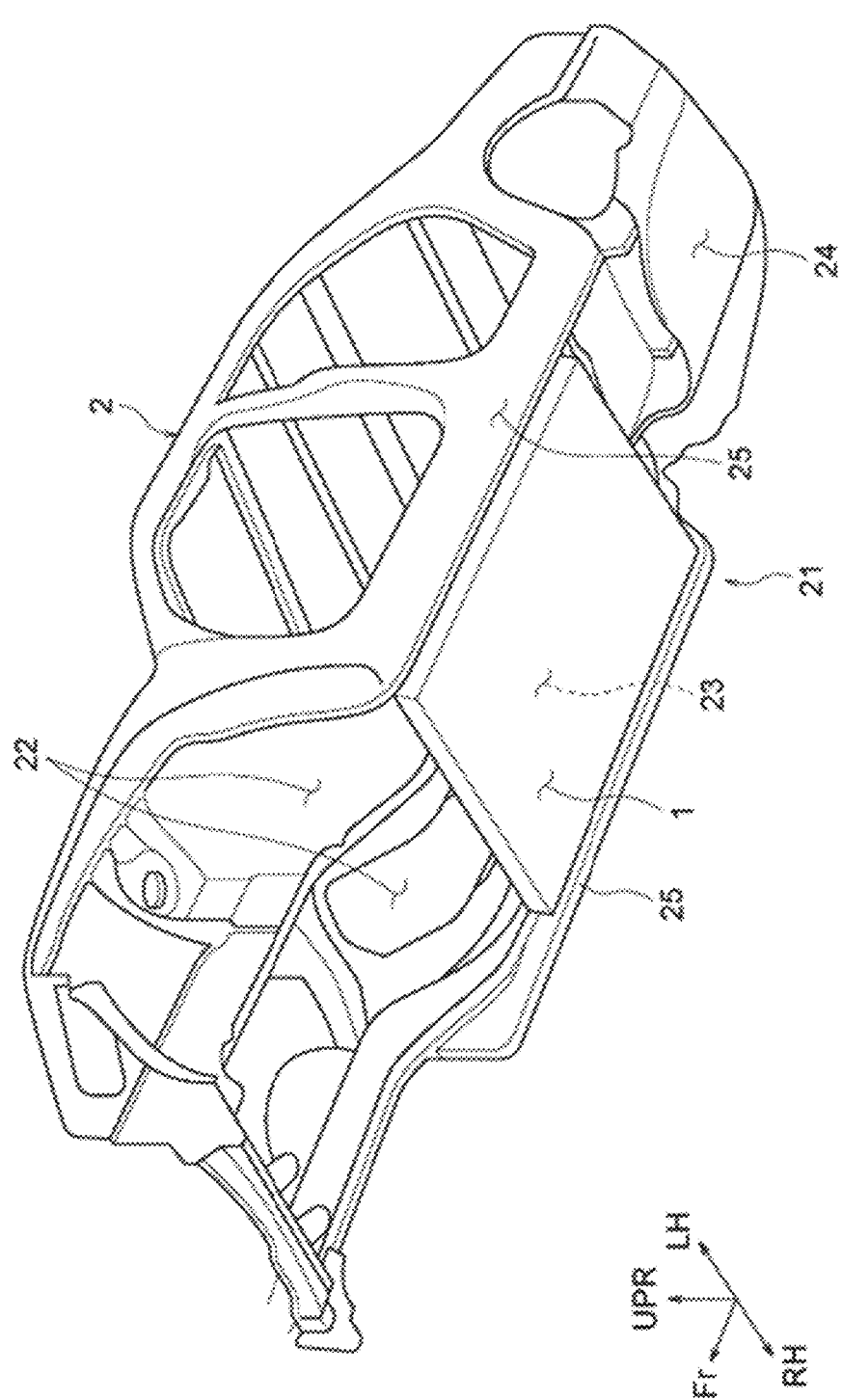
FIG. 2 is a perspective view illustrating a state in which the battery frame of FIG. 1 is attached to the floor back of an automobile body.
Figure 3:
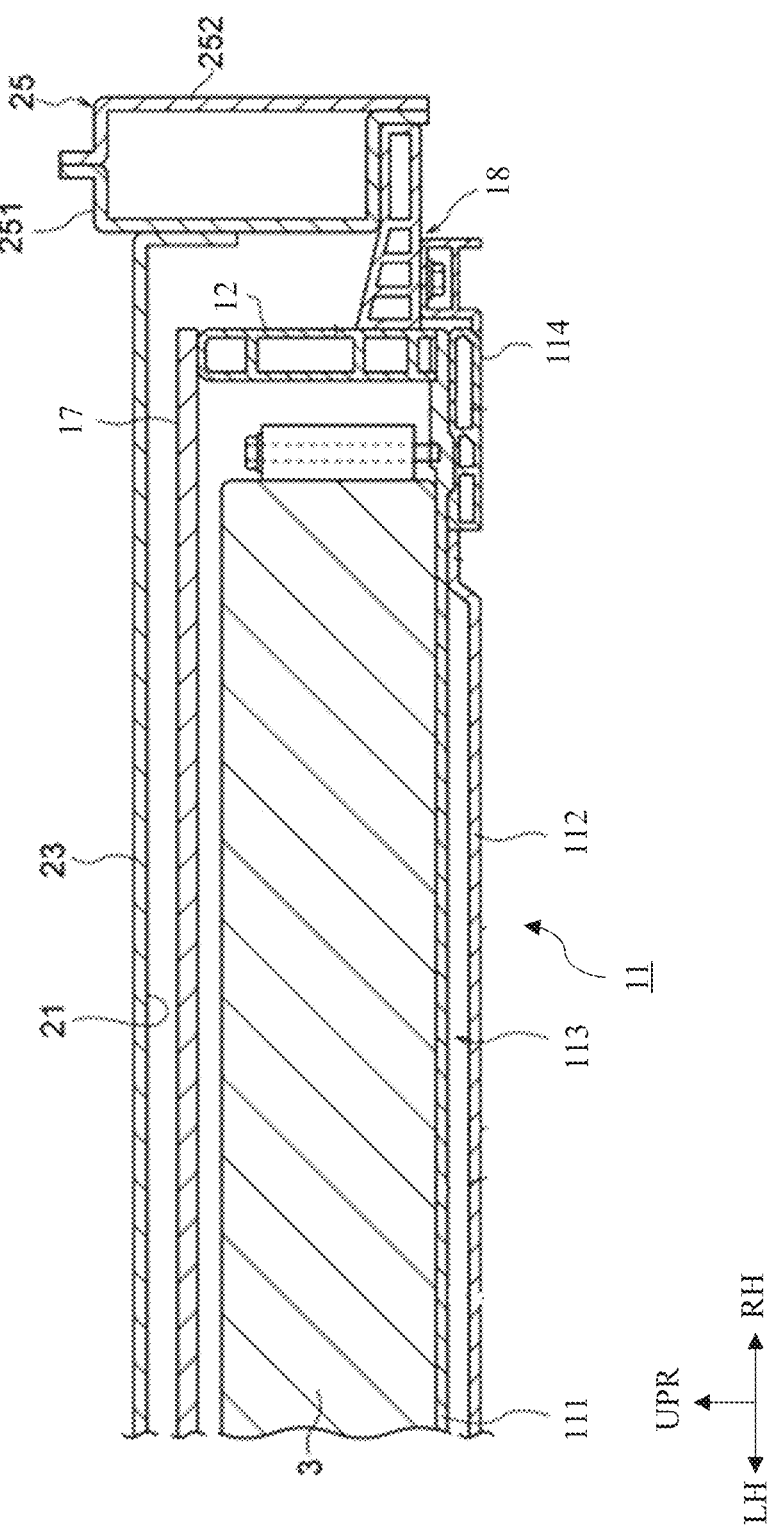
FIG. 3 is a cross-sectional view taken along a line III-III of FIG. 1.

Additionally or alternatively, as illustrated in FIG. 2, one or more second bottom-surface frames 112 are joined to one or more first bottom-surface frames 111 to form a space 113 for circulating a coolant, and the bottom-surface frame 11 may be reinforced with a plurality of bottom members 114 extending in the longitudinal direction of the automobile body 2. Although illustration is omitted, in the bottom-surface frame 11 of the present embodiment, a coolant cooled by a coolant cooling device such as a chiller can be circulated in the space 113 formed in the bottom-surface frame 11 thereby to appropriately cool the batteries 3 placed in contact with the first bottom-surface frames 111.

The side-surface frames 12 to 15 of the present embodiment are composed of four members: a pair of right and left side frames 12 and 13 extending in the vehicle longitudinal direction, a front frame 15 extending in the vehicle width direction at end portions of the side frames 12 and 13 on the vehicle front side, and a rear frame 14 extending in the vehicle width direction at end portions of the side frames 12 and 13 on the vehicle rear side. Note, however, that the side-surface frames are not limited to the above, and may be composed of less than four or five or more side-surface frames. Although not particularly limited, the bottom-surface frame 11 and the side-surface frames 12 to 15 can be composed of extruded products of aluminum material. When composed of extruded products of aluminum material, the bottom-surface frame 11 and the side-surface frames 12 to 15 are excellent in the heat transfer, weight reduction, and noise shielding. Although not particularly limited, each of the right and left side frames is provided as an integrated component (single component that is not separated) obtained by extrusion molding of an aluminum material, and as illustrated in FIGS. 1 and 2, extends as a single component from the front end portion of a front floor panel 23 of the automobile body 2 to the front end portion of a rear floor panel 24. Then, as illustrated in FIG. 1, a linear molded product obtained by performing the extrusion molding of an aluminum material is bent at two points on the rear side to form a shape along a rear wheel house.

Figure 4C:
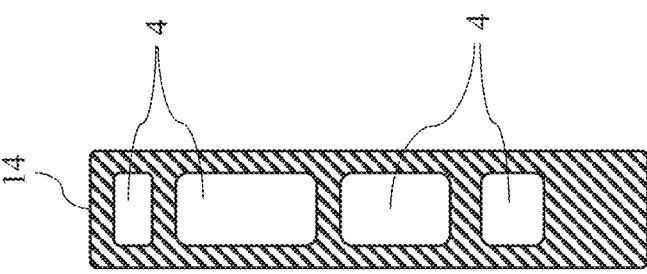
FIG. 4C is a cross-sectional view of a rear frame taken along a line IVC-IVC of FIG. 1.
Figure 4B:
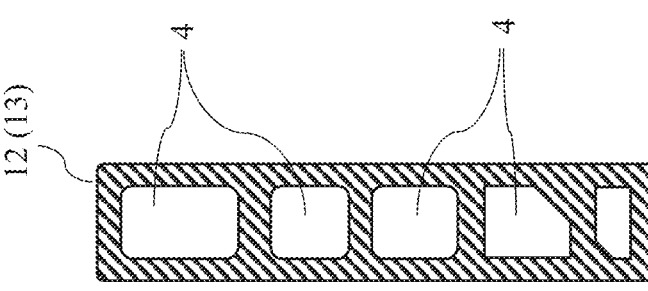
FIG. 4B is a cross-sectional view of a side frame taken along a line IVB-IVB of FIG. 1.
Figure 4A:
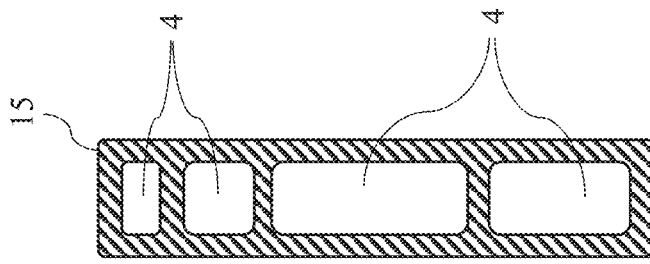
FIG. 4A is a cross-sectional view of a front frame taken along a line IVA-IVA of FIG. 1.

FIGS. 4A to 4C are cross-sectional views of the front frame 15, the side frames 12 and 13, and the rear frame 14 taken along lines IVA-IVA to IVC-IVC of FIG. 1, respectively. As illustrated in the figures, the four side-surface frames 12 to 15 are basically formed into the same hollow cross-sectional structures each having a plurality of internal spaces (which are also gas exhaust passages 4). By forming the side-surface frames 12 to 15 into the hollow cross-sectional structures, it is possible to ensure a certain strength while reducing the weight. The use of the axially continuous spaces formed inside the side-surface frames 12 to 15 as the gas exhaust passages 4 will be described later.

The battery frame 1 illustrated in FIG. 1 is assembled as an approximately rectangular parallelepiped housing through fixing the four side-surface frames 12 to 15 to the outer circumferential portion of the bottom-surface frame 11 by welding or the like and closing the opening on the top with a cover 17. The batteries 3 are housed in a space surrounded by the bottom-surface frame 11, the cover 17 facing the bottom-surface frame 11, and the four side-surface frames 12 to 15 in a state in which the batteries 3 are in contact with the bottom-surface frame 11 and at least one of the side-surface frames 12 to 15.

Each battery 3 (also referred to as an assembled battery) includes a plurality of battery modules 31, and each battery module is housed in a rectangular parallelepiped module case. Although illustration is omitted, a plurality of thin cells (also referred to as single cells) are housed inside each module case in a stacked state. In the present embodiment, the plurality of battery modules 31 are arranged and fixed side by side on the surface of the bottom-surface frame 11 so that respective main surfaces 311 of the plurality of battery modules 31 are perpendicular to the surface of the bottom-surface frame 11.

In other words, the plurality of battery modules 31 are arranged and fixed side by side on the surface of the bottom-surface frame 11 so that respective side surfaces 312 of the plurality of battery modules 31 are in contact with the surface of the bottom-surface frame 11. By arranging the plurality of battery modules 31 longitudinally in this way, all the battery modules 31 can be in contact with the bottom-surface frame 11 and can thus be cooled evenly. Reference numeral 16 illustrated in FIG. 1 represents cross members fixed to the upper surface of the bottom-surface frame 11 by welding or the like, which are members for reinforcing the bottom-surface frame 11 and partitioning the batteries 3 to fix them. FIG. 1 illustrates an arrangement example of the batteries 3 with dashed-two dotted lines.

The battery frame 1 in which the batteries 3 are housed in this manner is attached to a floor back surface 21 of the automobile body 2 by using a plurality of brackets 18, as illustrated in FIG. 3, after closing the top with the cover 17. Specifically, as illustrated in the figure, the right and left sides of the battery frame 1 are each attached to a sill inner panel 251 or a sill outer panel 252 of a sill 25, and the front end side and the rear end side are each attached to the front floor panel 23 or the rear floor panel 24 directly or indirectly.

As illustrated in FIG. 2, the battery frame 1 of the present embodiment is attached over almost the entire surface of a range from the front portion of the front floor panel 23 to the front portion of the rear floor panel 24 on the floor back surface 21 of the automobile body 2. In FIG. 2, reference numeral 22 represents a dash panel, and reference numeral 25 represents sills.

Now, the battery frame 1 of the present embodiment is assembled as an approximately rectangular parallelepiped housing through fixing the four side-surface frames 12 to 15 to the outer circumferential portion of the bottom-surface frame 11 by welding or the like and closing the opening on the top with the cover 17. This housing provides a watertight and airtight space in order to ensure waterproof properties. It is therefore necessary to exhaust the gas generated due to the chemical reaction of the battery electrolyte from the internal space of the battery frame 1 to the outside. To this end, in the battery frame 1 of the present embodiment, among the side-surface frames 12 to 15, a part of the front frame 15, all of the side frames 12 and 13, and a part of the rear frame 14 are provided with the gas exhaust passages 4 communicating with each other, which allow the gas generated due to the chemical reaction of the battery electrolyte to be exhausted from the internal space of the battery frame 1 to the outside. That is, by utilizing the spaces which are formed inside the side-surface frames 12 to 15 themselves during the extrusion molding, there is no need to provide a separate gas exhaust passage inside the battery frame 1 as in the prior art, and the space utilization ratio is thus improved.

When the front frame 15 of the battery frame 1 illustrated in FIG. 1 is provided as a pair of front frames 15 and 15, respective end portions of the pair of front frames 15 and 15 are formed as exhaust inlet portions 41, and the rear frame 14 is formed with exhaust outlet portions 42. Then, the gas exhaust passages 4 from the exhaust inlet portions 41 to the exhaust outlet portions 42 are formed inside the front frames 15, the side frames 12 and 13, and the rear frame 14 by connecting them.

Figure 5B:
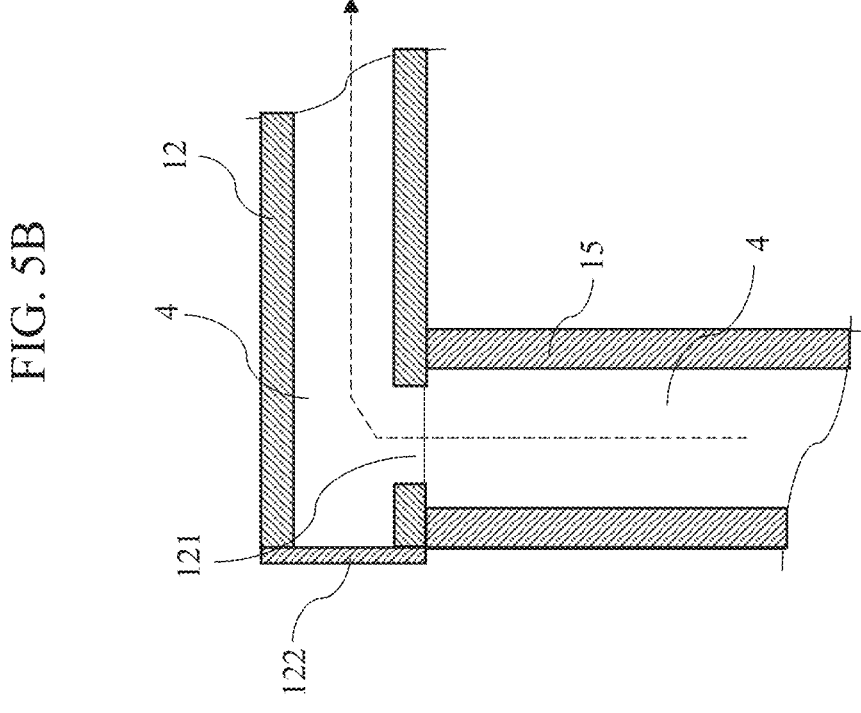
FIG. 5B is a transverse cross-sectional view illustrating a joint portion between a front frame and a side frame in a section VB of FIG. 1.
Figure 5A:
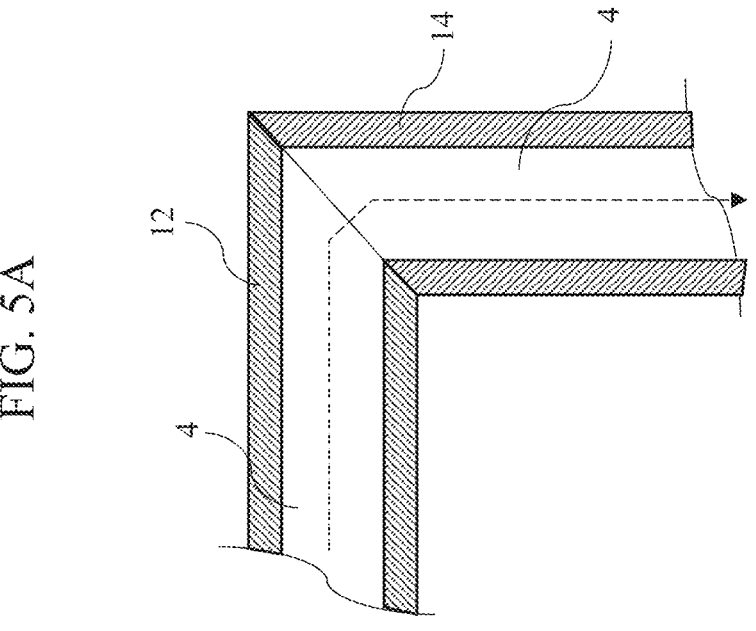
FIG. 5A is a transverse cross-sectional view illustrating a joint portion between a rear frame and a side frame in a section VA of FIG. 1.

FIG. 5A is a transverse cross-sectional view illustrating a joint portion between the rear frame 14 and the side frame 12 in a section VA of FIG. 1, and FIG. 5B is a transverse cross-sectional view illustrating a joint portion between the front frame 15 the side frame 12 in a section VB of FIG. 1. As for the rear-side joint portion between the rear frame 14 and the side frame 12 of the present embodiment, as illustrated in FIG. 5A, the end surface of the rear frame 14 and the rear-side end surface of the side frame 12 are scraped off, for example, at an angle of 45° and are butted and joined by welding. At this time, the space inside the rear frame 14 and the space inside the side frame 12 communicate with each other thereby to allow the gas exhaust passage 4 of the rear frame 14 and the gas exhaust passage 4 of the side frame 12 to communicate with each other.

On the other hand, as for the front-side joint portion between the front frame 15 and the side frame 12 of the present embodiment, as illustrated in FIG. 5B, the front-side end surface of the side frame 12 is closed with a lid 122 while the side surface is formed with an opening portion 121, and the end surface of the front frame 15 is butted and joined by welding to the side surface of the side frame 12 so as to include the opening portion 121. At this time, the space inside the front frame 15 and the space inside the side frame 12 communicate with each other thereby to allow the gas exhaust passage 4 of the front frame 15 and the gas exhaust passage 4 of the side frame 12 to communicate with each other. In addition, by connecting the front frame 15 and the side frames 12 as illustrated in FIG. 5B, even if there is a manufacturing error in the length of the side frames 12 and 13, it can be absorbed. In another embodiment, the joint portion between the front frame 15 and the front side of the side frame 12 may be configured as illustrated in FIG. 5A while the joint portion between the rear frame 14 and the rear side of the side frame 12 may be configured as illustrated in FIG. 5B.

As illustrated in FIG. 1, the gas generated in the internal space of the battery frame 1 flows from the exhaust inlet portions 41 and 41 at the end portions of the front frames 15 and 15 into the gas exhaust passages 4 and 4, reaches the gas exhaust passages 4 and 4 of the side frames 12 and 13 through the connection portions illustrated in FIG. 5B, then flows down to the rear frame 14 through the connection portions illustrated in FIG. 5A, and is exhausted from the exhaust outlet portions 42 formed on the rear frame 14. The exhaust inlet portions 41 open into a watertight and airtight space while the exhaust outlet portions 42 are exposed to the floor back of the automobile body 2. Accordingly, in the battery frame 1 of the present embodiment, the exhaust outlet portions 42 are provided with respective valves 43.

Figure 6A:
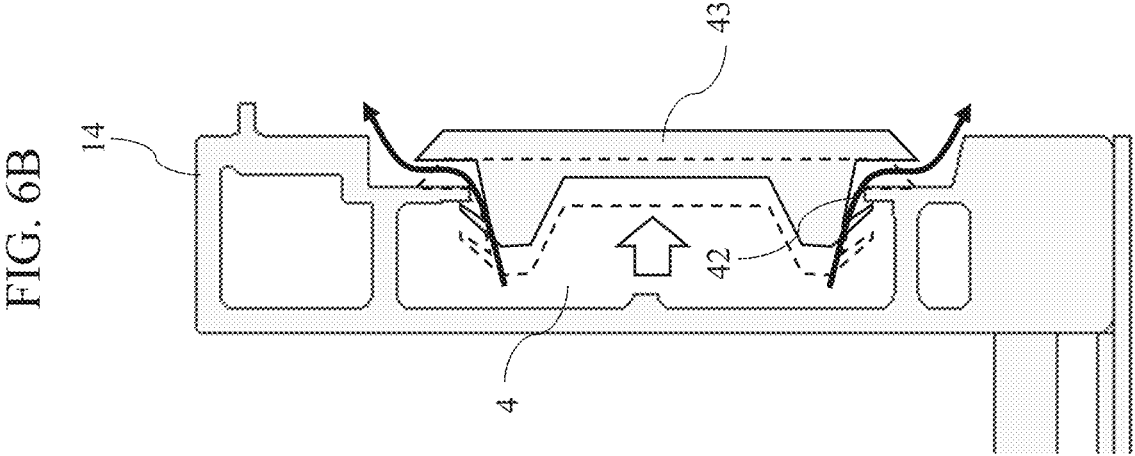
FIG. 6A is a cross-sectional view illustrating a valve (closed state) in a section VI of FIG. 1.
Figure 6B:
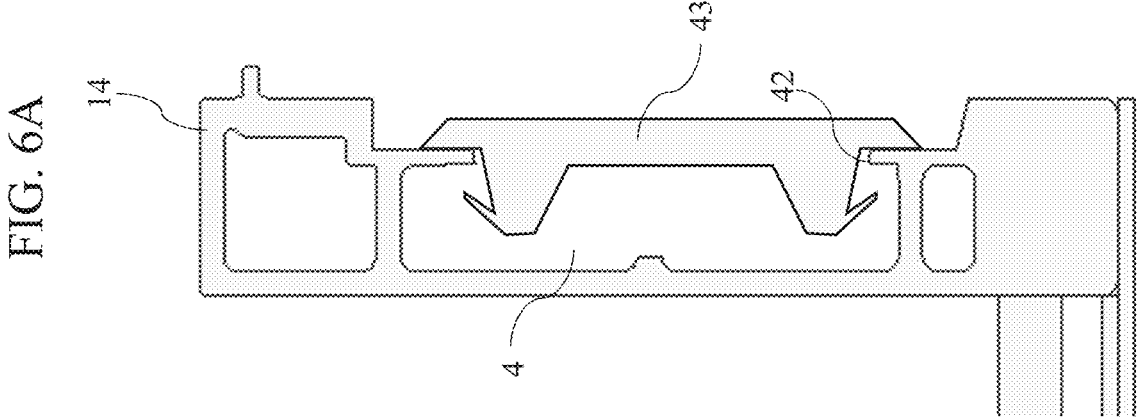
FIG. 6B is a cross-sectional view illustrating the valve (open state) in a section VI of FIG. 1.

FIGS. 6A and 6B are cross-sectional views illustrating a closed state and an open state of the valves 43 provided on the exhaust outlet portions 42 of sections VI of FIG. 1. Each valve 43 of the present embodiment includes an elastic body (not illustrated) for opening and closing the opening of the corresponding exhaust outlet portion 42. This elastic body acts as follows: when the internal pressure of the gas exhaust passage 4 is less than a predetermined value, the valve 43 operates to close the exhaust outlet portion 42 as illustrated in FIG. 6A while when the internal pressure of the gas exhaust passage 4 is not less than the predetermined value, the valve 43 operates to open the exhaust outlet portion 42 as illustrated in FIG. 6B. By providing the valves 43 on the exhaust outlet portions 42, it is possible to prevent water from entering the gas exhaust passages 4 from the floor back.

As described above, the battery frame 1 for a vehicle of the present embodiment comprises: the plate-shaped bottom-surface frame 11; and the side-surface frames including the pair of right and left side frames 12 and 13 that are fixed to the outer circumference portion of the bottom-surface frame 11 and extend in a vehicle longitudinal direction. The battery frame 1 is attached to the floor back surface 21 of the automobile body 2 to support the batteries 3. The side frames 12 and 13 are each provided inside with the gas exhaust passage 4. That is, by utilizing the spaces which are formed inside the side frames 12 and 13 themselves during the extrusion molding, there is no need to provide a separate gas exhaust passage inside the battery frame 1 as in the prior art, and the space utilization ratio is thus improved.

Moreover, according to the battery frame 1 for a vehicle of the present embodiment, the side-surface frames comprise: the pair of right and left side frames 12 and 13; the front frame 15 extending in the vehicle width direction at the end portions of the side frames 12 and 13 on the vehicle front side; and the rear frame 14 extending in the vehicle width direction at the end portions of the side frames 12 and 13 on the vehicle rear side, and the gas exhaust passage 14 extends from each of the end portions of the side frames 12 and 13 on the vehicle front side to each of the end portions of the side frames 12 and 13 on the vehicle rear side. This allows the high-temperature gas to be exhausted to the outside in a state of being cooled while passing through at least the side frames 12 and 13.

Furthermore, according to the battery frame 1 for a vehicle of the present embodiment, the front frame 15 is provided with the gas exhaust passage 4 communicating with the gas exhaust passage 4 of each of the right and left side frames 12 and 13 and the exhaust inlet portion 41 communicating between the gas exhaust passage 4 of the front frame 15 and the space surrounded by the battery frame 1, and the rear frame 14 is provided with the gas exhaust passage 4 communicating with the gas exhaust passage 4 of each of the right and left side frames 12 and 13 and the exhaust outlet portion 42 communicating between the gas exhaust passage 4 of the rear frame 14 and outside of the space surrounded by the battery frame 1. With this configuration, the gas generated in the internal space of the battery frame 1 flows from the exhaust inlet portions 41 and 41 at the end portions of the front frames 15 and 15 into the gas exhaust passages 4 and 4, reaches the gas exhaust passages 4 and 4 of the side frames 12 and 13 through the connection portions illustrated in FIG. 5B, then flows down to the rear frame 14 through the connection portions illustrated in FIG. 5A, and is exhausted from the exhaust outlet portions 42 formed on the rear frame 14. Even when the gas generated in the internal space of the battery frame 1 has a high temperature, the gas is exhausted from the exhaust outlet portions 42 in a cooled state because the gas exhaust passages 4 are formed sufficiently long. In addition, the gas is exhausted to the outside from the exhaust outlet portions 42 provided on the rear frame 14 extending in the vehicle width direction, so the blowing of the gas to the surroundings is also suppressed.

Moreover, according to the battery frame 1 for a vehicle of the present embodiment, one end portion of each of the side frames 12 and 13 and one end portion of the front frame 15 or the rear frame 14 are joined so as to abut against each other as illustrated in FIG. 5A, while the other end portion of each of the side frames 12 and 13 and the other end portion of the front frame 15 or the rear frame 14 are joined so that, as illustrated in FIG. 5B, the side frames 12 and 13 are each provided with the opening portion 121 communicating with the gas exhaust passage 4 in the other end portion of the front frame 15 or the rear frame 14 and the other end portion of the front frame 15 or the rear frame 14 abuts against the opening portion 121. With this configuration, even if there is a manufacturing error in the length of the side frames 12 and 13, it can be absorbed.

Furthermore, according to the battery frame 1 for a vehicle of the present embodiment, the exhaust outlet portion 42 is provided with the valve 43 that closes the exhaust outlet portion 42 when the internal pressure in the gas exhaust passage 4 is less than a predetermined value and opens the exhaust outlet portion 42 when the internal pressure in the gas exhaust passage 4 is not less than the predetermined value. With this configuration, it is possible to prevent water from entering the gas exhaust passages 4 from the floor back.

In addition, the pair of right and left side frames 12 and 13 are each provided as an integrated component and extend from the front end portion of the front floor panel 23 of the automobile body 2 to the front end portion of the rear floor panel 24. This can reduce the working processes such as welding and joining. Moreover, the inner surfaces of the gas exhaust passages 4 are composed of smooth flat surfaces or curved surfaces, so the flow resistance of the gas is reduced.

In the above-described embodiment, the pair of right and left front frames 15 and 15 are exemplified, but alternatively a single front frame 15 may be used alone. In this case, the front frame 15 may be provided with one or more exhaust inlet portions 41 at predetermined locations.

DESCRIPTION OF REFERENCE NUMERALS

1 Battery frame
11 Bottom-surface frame

111 First bottom-surface frame
112 Second bottom-surface frame
113 Space
114 Bottom member
12, 13 Side frame (side-surface frame)
121 Opening portion
122 Lid
14 Rear frame (side-surface frame)
15 Front frame (side-surface frame)
16 Cross member
17 Cover
18 Bracket
2 Automobile body
21 Floor back surface
22 Dash panel
23 Front floor panel
24 Rear floor panel
25 Sill
3 Battery
31 Battery module
4 Gas exhaust passage
41 Exhaust inlet portion
42 Exhaust outlet portion
43 Valve

The invention claimed is:

1. A battery frame for a vehicle, comprising:
a plate-shaped bottom-surface frame; and
side-surface frames including a pair of right and left side frames that are fixed to an outer circumference portion of the plate-shaped bottom-surface frame and extend in a vehicle longitudinal direction,
the battery frame being attached to a floor back of an automobile body to support a battery,
the side-surface frames comprising:
the pair of right and left side frames each provided inside with a gas exhaust passage extending from an end portion on a vehicle front side to an end portion on a vehicle rear side;

a front frame extending in a vehicle width direction at end portions of the pair of right and left side frames on the vehicle front side; and
a rear frame extending in the vehicle width direction at end portions of the pair of right and left side frames on the vehicle rear side,
the front frame being provided with a gas exhaust passage communicating with the gas exhaust passage of each of the pair of right and left side frames and an exhaust inlet portion communicating between the gas exhaust passage of the front frame and a space surrounded by the battery frame,
the rear frame being provided with a gas exhaust passage communicating with the gas exhaust passage of each of the pair of right and left side frames and an exhaust outlet portion communicating between the gas exhaust passage of the rear frame and outside of the space surrounded by the battery frame.

2. The battery frame for a vehicle according to claim 1, wherein one end portion of each of the pair of right and left side frames and one end portion of the front frame or the rear frame are joined so as to abut against each other, and
another end portion of each of the pair of right and left side frames and another end portion of the front frame or the rear frame are joined so that the pair of right and left side frames are each provided with an opening portion communicating with the gas exhaust passage in the other end portion of the front frame or the rear frame and the other end portion of the front frame or the rear frame abuts against the opening portion.

3. The battery frame for a vehicle according to claim 1, wherein the exhaust outlet portion is provided with a valve that closes and opens the exhaust outlet portion according to internal pressure in the gas exhaust passage.

4. The battery frame for a vehicle according to claim 1, wherein the pair of right and left side frames are each provided as an integrated component and extend from a front end portion of a front floor of the automobile body to a front end portion of a rear floor.

* * * * *